(12) United States Patent
Jansen

(10) Patent No.: US 7,137,613 B2
(45) Date of Patent: Nov. 21, 2006

(54) PATTERN FACTOR CONTROL VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 0 days.

(21) Appl. No.: 11/268,013

(22) Filed: Nov. 7, 2005

(65) Prior Publication Data

US 2006/0219968 A1 Oct. 5, 2006

Related U.S. Application Data

(60) Continuation-in-part of application No. 11/149,870, filed on Jun. 10, 2005, now Pat. No. 7,004,449, which is a division of application No. 10/377,979, filed on Feb. 28, 2003, now Pat. No. 6,918,569, said application No. 11/268,013.

(60) Provisional application No. 60/361,446, filed on Feb. 28, 2002, provisional application No. 60/625,298, filed on Nov. 5, 2004.

(51) Int. Cl.
*F16K 31/10* (2006.01)
*F02C 9/26* (2006.01)

(52) U.S. Cl. .............................. 251/129.08; 251/129.2; 251/298

(58) Field of Classification Search ........... 251/129.08, 251/129.2, 298
See application file for complete search history.

(56) References Cited

U.S. PATENT DOCUMENTS

| | | | | | |
|---|---|---|---|---|---|
| 3,532,121 | A | * | 10/1970 | Sciortino et al. | 251/129.17 |
| 3,570,807 | A | * | 3/1971 | Sturman et al. | 251/282 |
| 4,285,497 | A | * | 8/1981 | Gottel | 251/129.2 |
| 4,574,841 | A | * | 3/1986 | Hugler | 251/65 |
| 4,783,047 | A | * | 11/1988 | Baltus et al. | 251/129.2 |
| 5,257,639 | A | * | 11/1993 | Prescott et al. | 251/129.08 |
| 6,786,236 | B1 | | 9/2004 | Jansen | |

* cited by examiner

*Primary Examiner*—John Bastianelli
(74) *Attorney, Agent, or Firm*—Quarles & Brady LLP

(57) ABSTRACT

A fuel valve for use in regulating the pattern factor of a gas turbine has a highly accurate pressure balanced clevis valve assembly. The clevis valve is pivotally mounted inside the valve housing by a flexure pivot, and has a pair of legs at each side of a valve body that control flow through pairs of flow orifices. An armature mounts to the clevis valve, and when energized, an electromagnet inside the valve housing generates magnetic flux that moves the armature to pivot the clevis valve to open or closed the orifices. The clevis valve is inherently balanced and can meter fuel through multiple orifices simultaneously.

20 Claims, 9 Drawing Sheets

PATTERN FACTOR CONTROL VALVE

CROSS-REFERENCE TO RELATED APPLICATIONS

This application claims benefit to U.S. provisional application Ser. No. 60/625,298, filed Nov. 5, 2004, and is a continuation-in-part application of U.S. application Ser. No. 11/149,870, filed Jun. 10, 2005, now U.S. Pat. No. 7,004,449, which is a divisional application of U.S. application Ser. No. 10/377,979, filed Feb. 28, 2003, now U.S. Pat. No. 6,918,569, which claims benefit to U.S. provisional application Ser. No. 60/361,446 filed Feb. 28, 2002.

STATEMENT OF FEDERALLY SPONSORED RESEARCH OR DEVELOPMENT

Not applicable.

BACKGROUND OF THE INVENTION

1. Technical Field

The present invention relates to fuel valves, and in particular, to highly accurate valves suitable for use in regulating fuel to the burners of turbine engine systems.

2. Description of the Related Art

Modern gas turbines used in the generation of power typically employ various lean fuel/air mixing techniques, largely to reduce the levels of harmful nitrogen oxides exhausted. Altering the fuel to air ratio to reduce NOX emissions can cause "screech" or instability in the combustion such that the burner flame is inconsistent or unsustainable. The unstable burning generates pressure fluctuations in the combustion cans. These pressure fluctuations cause oscillating waves in the combustion can on the order of several hundred cycles per second. This high frequency vibration can cause rapid breakdown of the combustion components which can send particles or other debris to the turbine blades and thereby cause severe structural damage to the turbine.

Sophisticated combustion control systems have been developed to continuously monitor and actively stabilize the combustion of modern gas turbines to avoid or minimize these adverse affects on the turbine. These systems usually include high speed pressure transducers located, for example, in the combustion can to sense the pressure oscillations arising from the unstable burning. The transducers provide pressure signals to a control computer which processes the signals according to various algorithms to control various combustion components or parameters to counteract the pressure oscillations. Typically, this involves pulsing the fuel sent to the combustion cans at very high rates commensurate with the frequency of the pressure oscillations. This is ordinarily accomplished by rapidly operating the fuel metering valves. However, many metering valves are insufficiently responsive and accurate to the detriment of the turbine performance.

Modern gas turbine engines used for power generation are very large and capable of a continuous power output between 200–500 megawatts. Such high output requires significant fuel consumption on the order of 200–400 gallons per minute. To effectively burn this high flow volume, typical industrial gas turbine divide the fuel flow and burning into several combustion cans, often more than 10. The combustion cans are typically arranged in an array, such that burned fuel in each combustion can provides a flame front that effects a pressure change that drives the turbine blades. The pressure variation is dependent upon the temperature of the flame front. The higher the flame temperature, the greater the change in pressure, and thus the more power output from the turbine. However, the overall flame temperature is actually an average of the flame temperature at each burner or combustion can. The temperature gradient profile of the several burners is defined by its "pattern factor", which is typically defined as the difference between the peak and average combustor exit temperatures divided by the average exit temperature expressed as:

$$\text{Pattern Factor} = \frac{T(exit)_{peak} - T(exit)_{avg}}{T(exit)_{avg}}$$

Ideally, the average flame temperature of all combustion cans should equal the flame temperature at the flame front so that the pattern factor is zero. However, the average temperature is actually some valve less than the peak temperature, resulting in a positive pattern factor value. Should one or more combustion cans have a significantly low temperature, the average flame front temperature can vary significantly from the peak temperature, thereby resulting in a high pattern factor, and inefficient operation of the turbine.

Systems for controlling the turbine pattern factor are known. Typically, such systems include an electronic control that uses temperature feedback signals at each combustor can to regulate flow to the burners. Individual control fuel control valves are used so that fuel flow to selected burners can be controlled. As with the previously described problem, these valves are often insufficiently responsive and inaccurate, particularly at the high flow rate and pressure experienced in such applications, to achieve the desired control of the burner temperature profile. Moreover, these valves are also very susceptible to deterioration due to the contaminated and aggravated temperature environments in which they are used, such that the accuracy problem becomes exacerbated with extended use.

Accordingly, an improved fuel valve is needed for use in a pattern factor control system for a gas turbine.

SUMMARY OF THE INVENTION

The present invention provides a highly accurate and responsive fuel control valve particularly designed for regulating the pattern factor of a multi-burner gas turbine such as commonly found in the power generation industry or in other multi-fuel injection points found in annular shaped burners.

Specifically, the valve includes a housing having an inlet port and an outlet port. A valve body is disposed within the valve housing that defines a passageway and a pair of orifices in communication with the inlet and outlet ports. A clevis valve member has at least two spaced apart prongs located adjacent to the valve body to interrupt flow through the orifices when the clevis valve member is in a closed position so as to prevent flow from the inlet port to the outlet port. A flexure pivot has a first end mounted to the housing and a second end movable relative to the first end to which the clevis valve member is coupled to permit the clevis valve member to pivot between the open and closed positions under the force of a drive assembly.

One aspect of the valve of the present invention is the high level of precision and accuracy arising from the construction of the valve and valve drive assemblies. The clevis valve allows for control of metering through multiple flow orifices at one time, and because all metering edges are located on the same piece, all of the orifices are metered to provide the same amount of flow. In one preferred form, the valve body has sets of two slot-like orifices at opposite sides and each prong of the clevis valve member has two legs with metering edges spaced apart in registration with the orifices such that pivoting of the clevis valve member moves each leg of the clevis member the same distance with respect to its associated orifice. The clevis valve arrangement also allows for close clearances to be maintained at the metering orifices to minimize leakage and transient flow variations.

The drive assembly is preferably a magnetic drive having an electromagnetic coil that drives an armature coupled to the clevis. The armature, and thereby the clevis valve, can thus be made to move in proportion to the input signal to the drive assembly. Proportional flow control allows flow to be accurately regulated by electronic control of the drive signal. Preferably, the drive assembly includes a stator spaced from the armature. The armature can have a U-shape construction with a pair of side walls disposed at and spaced from opposite sides of the valve body and a back wall bridging the side walls. The side walls have end surfaces that are spaced from corresponding end surfaces of the pole piece.

Another aspect of the invention is its inherently balanced nature. The forked configuration of the clevis allows it to straddle the valve with metering edges of the clevis prongs located equally at opposite sides of the valve body centerline. The valve body can thus have orifices at two opposite sides, with the flow being controlled by the clevis. Moreover, the clevis valve member moves in a pivotal motion along an arc generally in the direction of fuel flow. Preferably, the flexure pivot has a non-moving part that is bolted to the valve housing and a moveable part that is fixed to the clevis or drive armature. One or more spokes, preferably two spaced apart 180 degrees, join the two parts of the flexure pivot and are firm but sufficiently flexible to allow movement of the movable part, and thus pivoting of the clevis valve. The clevis valve is able to operate accurately at very high flow volumes and flow rates due to its balanced, low drag ("frictionless") construction and mounting arrangement, which minimize transient forces on the clevis valve.

Yet another aspect of the valve of the present invention is its self-cooling capabilities. The drive mechanism of the valve (except for the electronics) can be contained in the valve housing within the fuel flow path between the inlet and outlet ports. The heat generated by the electromagnet can thus be dissipated by the fuel flowing through the valve. No additional air or liquid cooling schemes are thus needed for sustained operation of the valve.

These and still other advantages of the invention will be apparent from the detailed description and drawings. What follows are preferred embodiments of the present invention. To assess the full scope of the invention the claims should be looked to as the preferred embodiments are not intended as the only embodiments within the scope of the invention.

DETAILED DESCRIPTION OF THE PREFERRED EMBODIMENTS

Figure 1:
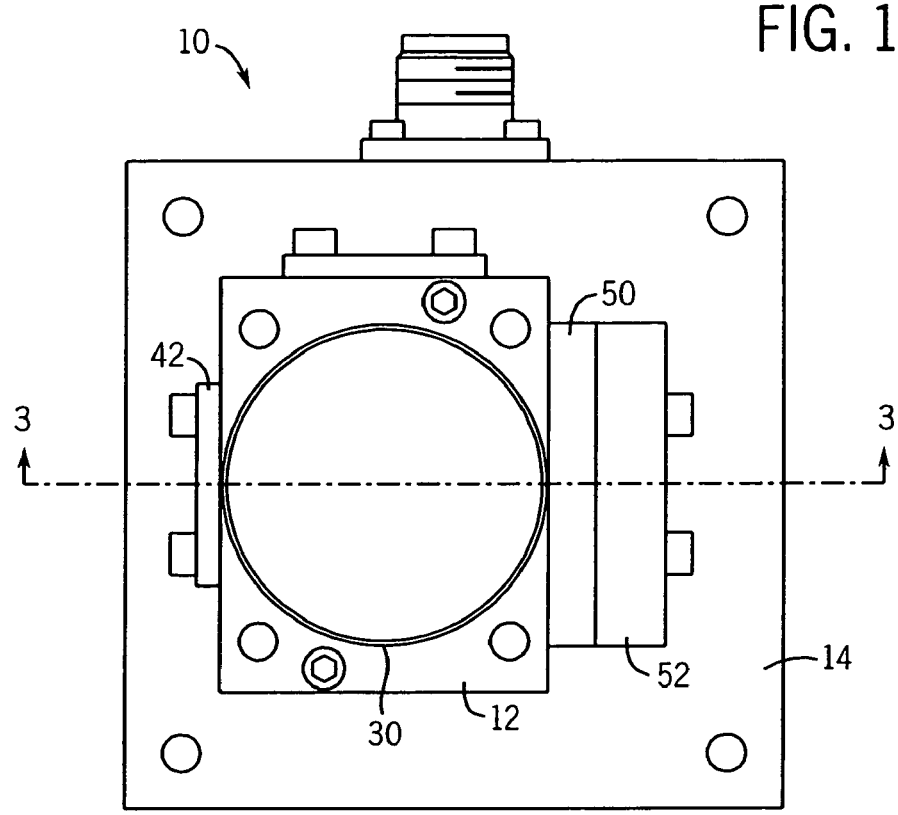
FIG. 1. is an end view of the active combustion fuel metering valve of the present invention.
Figure 2:
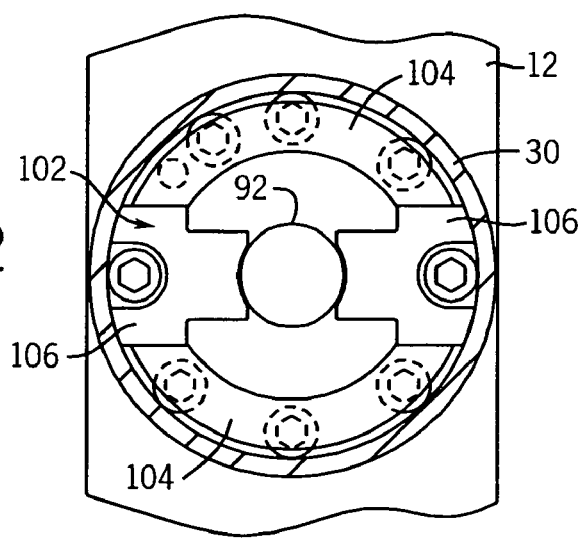
FIG. 2 is a partial sectional view taken along line 2—2 of FIG. 3 showing the permanent magnet arrangement of the valve of FIG. 1.

The present invention provides a high flow volume and flow rate fuel metering valve having attributes designed to make it highly responsive to input drive signals, for example having low weight, pressure balanced actuating components with low damping, low drag and bluff body forces and low hysteresis, such that is suitable to operate in high rate gas turbine combustion control systems designed to stabilize the combustion process of the burners. Disclosed herein are two preferred embodiments of an active combustion control valve and a preferred embodiment of a pattern factor control valve according to the present invention. The first embodiment utilizes a flapper valve member that is pressure balanced by a rolling diaphragm piston. The second embodiment described uses an inherently balanced bridged clevis to simultaneously control metering through multiple metering orifices (four in the described valve). The pattern factor control valve described herein uses a similar clevis valve arrangement to control fuel flow to the individual burners of the turbine. Many of the components of the valves are the same or similar. This is especially true for the two active combustion control valves, the primary exception being the use of either a flapper or a clevis valve member, yet both of those valve embodiments have very similar operational characteristics. In the drawings, FIG. 2 is common to the two active combustion valve embodiments while FIGS. 1 and 3–6 illustrate only the flapper embodiment of the valve and FIGS. 7–11 illustrate only the bridged clevis embodiment. FIGS. 12–15 illustrate the pattern factor control valve embodiment.

Active Combustion Control

The flapper valve embodiment will now be described in detail with reference to FIGS. 1–3. The valve 10 includes a valve housing 12 which mounts to a manifold block 14 to which connect fuel lines leading from a fuel supply and to the combustion can of a gas turbine engine (not shown). The manifold block 14 includes internal inlet 16, outlet 18 and balancing 20 passageways (shown in phantom). The inlet 16 and outlet passageways 18 lead from primary ports (such as pressure port 22) to which the fuel lines are connected. Balancing passageway 20 can be routed to the pressure port 22 directly (as shown) or indirectly via the inlet passageway 16 for use in balancing the valve member as discussed below. The valve housing 12 has inlet 24 and outlet 26 ports, sealed by o-rings 28, allowing communication of fuel from the inlet 16 and outlet 18 passageways in the manifold block 14.

The valve housing 12 is enclosed by a cylindrical cover 30 and defines a nozzle chamber 32 concentric with a nozzle axis 34 and a main chamber 36 concentric with a main axis 38 such that the two chambers intersect each other at a right angle. A nozzle body 40 defining nozzle orifice 41 is press fit into the nozzle chamber 32 between the inlet 24 and outlet 26 ports. One end of the nozzle chamber 32 is sealed by a plug 42 mounting an o-ring 44 and bolted to the valve housing 12.

Figure 3:
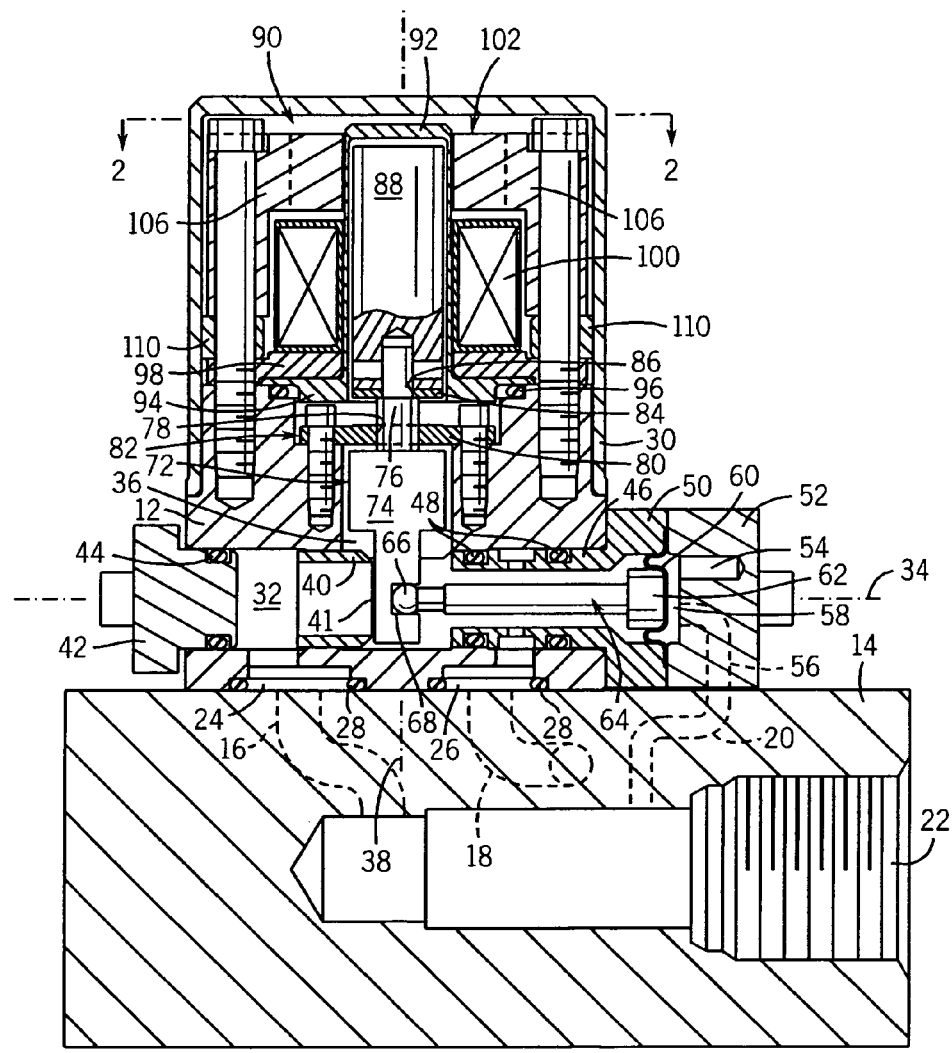
FIG. 3 is a cross-sectional view taken along line 3—3 of FIG. 1 showing a valve according to a first embodiment of the present invention having a diaphragm piston pressure balanced flapper valve member.
Figure 6:
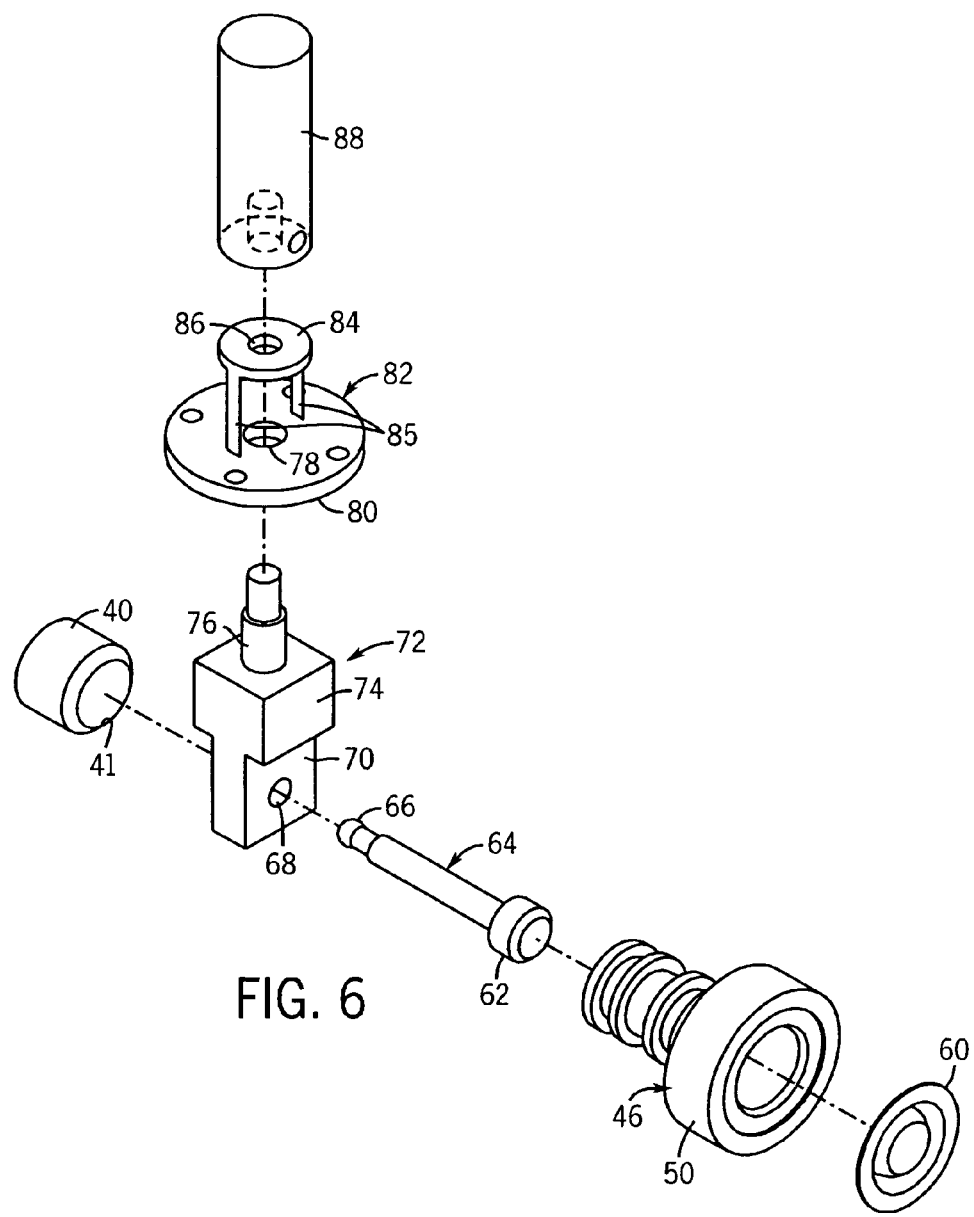
FIG. 6 is an exploded perspective view of the movable valve assembly of the valve of FIG. 3.
Figure 7:
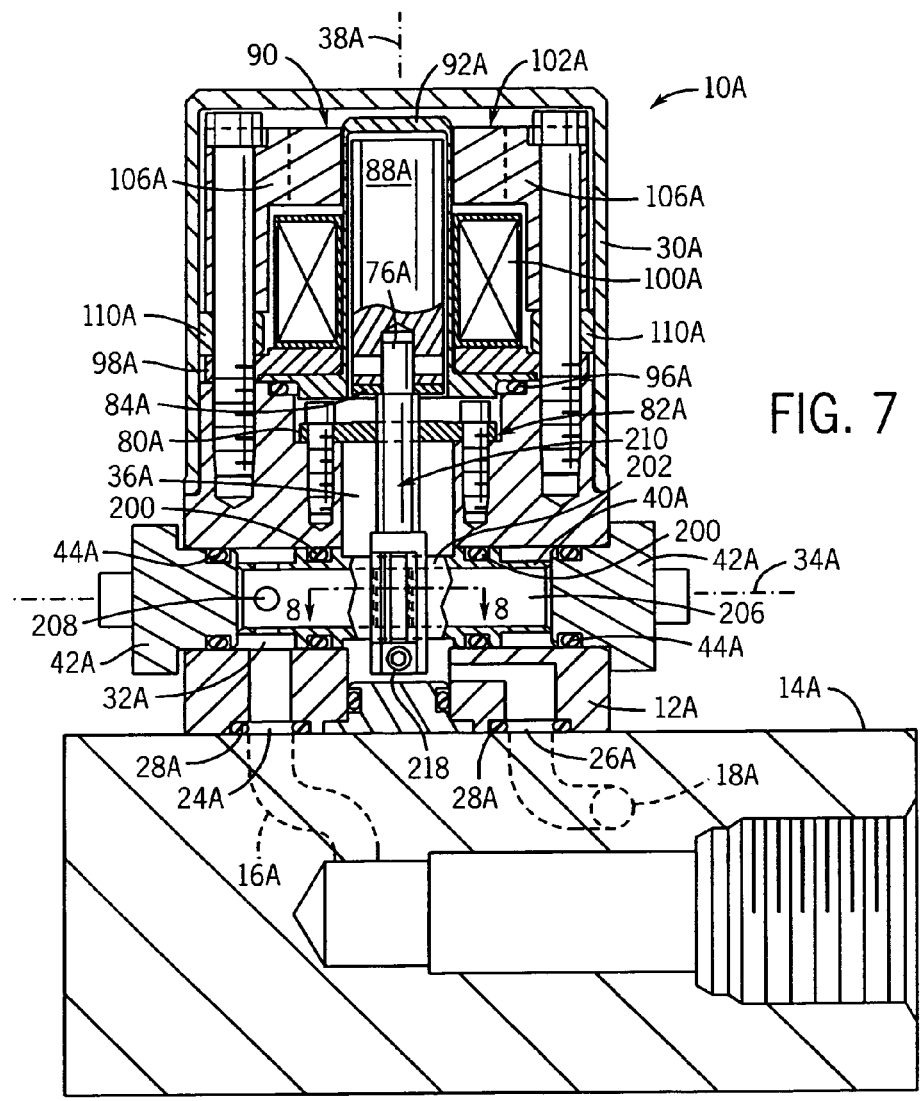
FIG. 7 is a cross-sectional view similar to FIG. 3 albeit of a second embodiment of the valve having a bridged clevis valve member.

Referring to FIGS. 3 and 6, the opposite end of the nozzle chamber 32 contains a piston sleeve 46 having a pair of o-rings 48 mating with the wall of the nozzle chamber 32. A flanged end 50 of the piston sleeve 46 is secured to the valve housing 12 by an end cap 52 bolted to the valve housing 12. The end cap 52 includes internal damping porting 54 as well as a passageway 56 (in phantom) sealingly coupled to the balancing passageway 20 of the manifold block 14. The passageway 56 terminates at a small cavity 58 at an upstream side of a rolling diaphragm 60, having an area approximately the same as the nozzle orifice 41, pinched between the piston sleeve 46 and the end cap 52 to seal off cavity 58. The head 62 of a plunger or piston 64 fits against into the center of the diaphragm 60 on the opposite side of cavity 58. A ball end 66 fits into a socket 68 in a working end 70 of a flapper 72, which extends along the main axis 38 in the main chamber 36. Since the upstream side of the diaphragm 60 is at the same pressure as the fuel at the inlet port 24 the pressure forces acting on opposite sides of the working end of the flapper 72 are equalized thereby allowing it to control metering efficiently and responsively without the adverse impact on position arising from transient pressure forces.

The working end 70 of the flapper 72 is rectangular and sized slightly larger than the nozzle orifice 41. The flapper 72 has a wider shoulder 74 intermediate a cylindrical stepped diameter stem 76. The stem 76 fits through a central opening 78 (sized smaller than the shoulder 74 of the flapper 72) of a fixed part 80 of a flexure pivot 82 bolted to the valve housing 12 concentric with the main axis 38 to suspend the flapper 72 in the main chamber 36. The flexure pivot 82 has a movable part 84 connected to the fixed part 80 by two spokes 85. The spokes 85 are strong but slightly deflectable to allow relative movement of part 84 with respect to part 80. The movable part 84 has a central opening 86 fit over the smaller diameter section of the flapper stem 76. The movable part 84 and the flapper stem 76 are brazed together with an armature 88 of a magnetic drive assembly 90. The armature 88 is supported by the flexure pivot 82 in a magnetically inert guide sleeve 92 having a flanged end 94 which seals off the main chamber 28, via o-ring 96, by seating against the valve housing 12. The flanged end 94 of the guide sleeve 92 is held in place by an end plate 98 bolted to the valve housing 12 by bolts holding the drive assembly 90 in place.

In addition to the armature 88, the drive assembly 90 includes a wire coil 100 disposed about the guide sleeve 92 between the end plate 98 and a permanent magnet assembly 102. As shown in FIGS. 2 and 3, the permanent magnet assembly 102 includes two arch shaped permanent magnets 104 as well as two identical ferromagnetic pole pieces 106 arranged in a circular about the main axis 38. The pole pieces 106 extend in a direction parallel to the main axis 38 to fit around an outer diameter of the coil 100. Non-magnetic spacers 110 take up the gap between the ends of the pole pieces 106 and the end plate 98.

The drive assembly 90 thus provides a permanent magnet motor for driving the flapper 72. The pole pieces 106 become magnetized by the permanent magnets and establish north and south poles providing a uni-directional magnetic flux force acting on the armature 88 in the direction from the north pole to the south pole. When current is applied to the coil 100 it acts as an electromagnet providing magnetic flux lines acting on the armature 88 that vary depending on the input current to the coil 100, tending to add or subtract from the force of the permanent magnet flux. The guide sleeve 92 and spacers 110 do not effect the flux path because they are made of magnetically inert materials. The negative spring rate acting on the armature 88 from the magnetic flux lines is coupled with the positive spring rate of the flexure pivot 82 such that the combined force effect on the armature 88 is proportional to the input current to the coil 100. Thus, the net effect on the armature 88 is a force tending to move the armature 88 toward one of opposite sides of the main axis 38 where either of the pole pieces 106 reside.

Figure 4:
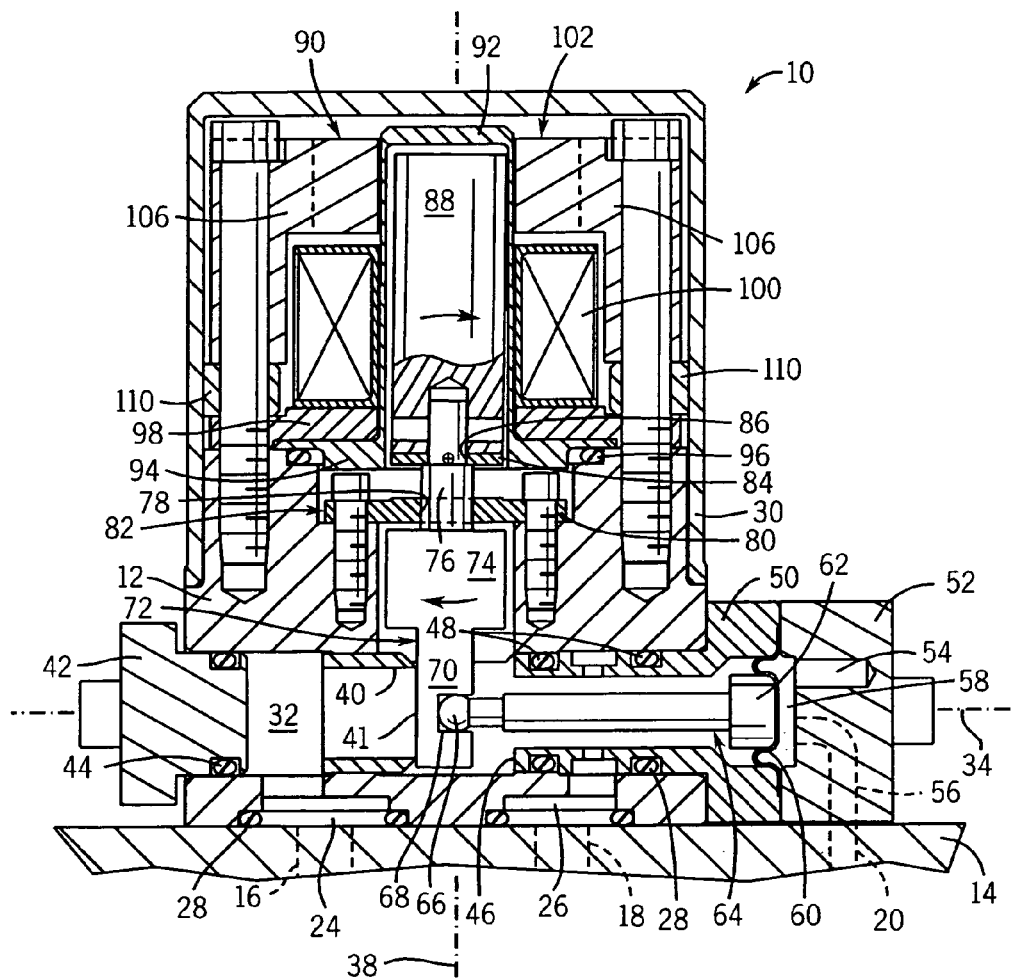
FIG. 4 is a slightly enlarged cross-sectional view of the valve of FIG. 3 albeit showing the flapper pivoted to closed position.
Figure 5:
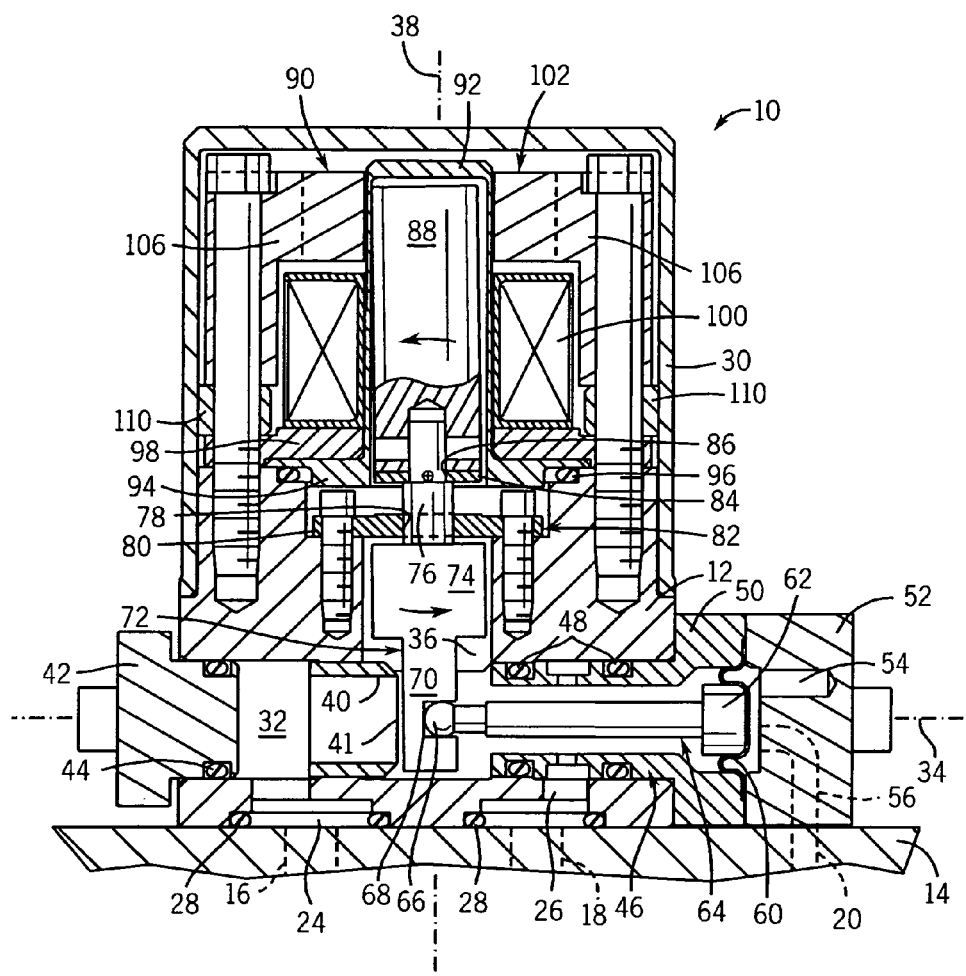
FIG. 5 is a view similar to FIG. 4 albeit showing the flapper pivoted to a fully open position.

Because the flapper 72 (and thereby the armature 88) are supported by the flexure pivot 82, driving the armature 88 side to side will cause the armature 88/flapper 72/movable part 84 assembly to pivot about the center of the fixed part 80 of the flexure pivot 82. Movement of the armature 88 toward the right (in FIG. 3) moves the working end of the flapper 72 toward the nozzle body 40 and vice versa. FIG. 3 shows the valve 10 with the flapper 72 in its resting position approximately at half stroke. The fully closed and open positions of the flapper 72 are shown in FIGS. 4 and 5, respectively. Note that in the preferred embodiment described herein, the amplitude of travel of the working end of the flapper 72 is approximately 0.01 to 0.001 inches. Moreover, the flapper 72 does not completely seal the nozzle orifice 41, but rather allows a very small amount of leakage because the flapper 72 simply abuts the nozzle body 40 and is at an oblique angle when in the fully closed position. To minimize the leakage, the face of the nozzle body 40 is preferably angled to correspond to the pivot angle.

Referring to FIGS. 7–11, the bridged clevis embodiment of the valve will now be described. As mentioned, many of the components of this embodiment are the same as in the flapper embodiment of the valve and thus similar components of this embodiment will be described using similar reference numbers, albeit with the suffix "A".

This embodiment of the valve 10A can include an identical valve housing 12A having a cover 30A and mounted to an identical manifold block 14A (possibly modified to exclude the balancing passageway). Like before, the valve housing 12A has o-ring 28A sealed inlet 24A and outlet 26A ports allowing communication of fuel from inlet 16A and outlet 18A passageways in the manifold block 14A. The valve housing 12A defines a nozzle chamber 32A concentric with a nozzle axis 34A and a perpendicular main chamber 36A concentric with a main axis 38A. The open ends of the nozzle chamber 32A are sealed by plugs 42A having o-rings 44A and which are bolted to the valve housing 12A.

Figure 8:
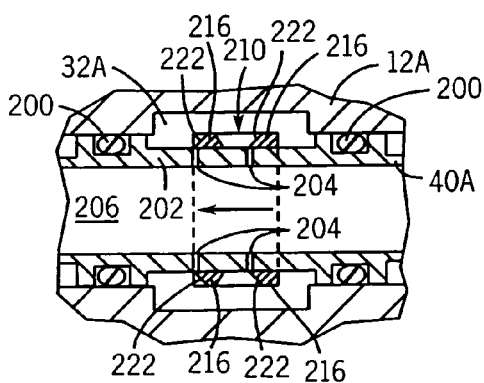
FIG. 8 is a partial cross-sectional view taken along line 8—8 of FIG. 7 showing the clevis fully closing off metering orifices.
Figure 9:
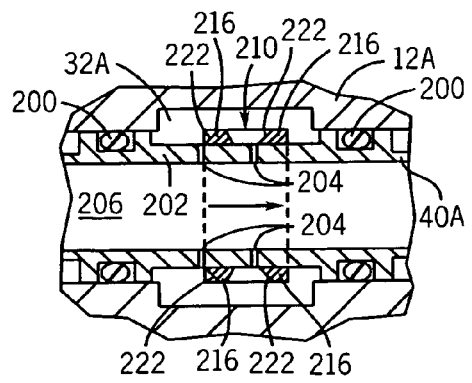
FIG. 9 is a view similar to FIG. 8 albeit showing the clevis in a fully open position.
Figure 10:
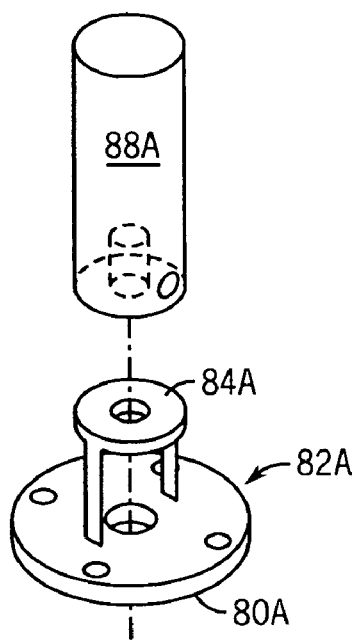
FIG. 10 is an exploded perspective view of the movable valve assembly (with the bridged clevis assembled) together with the nozzle body.
Figure 10:
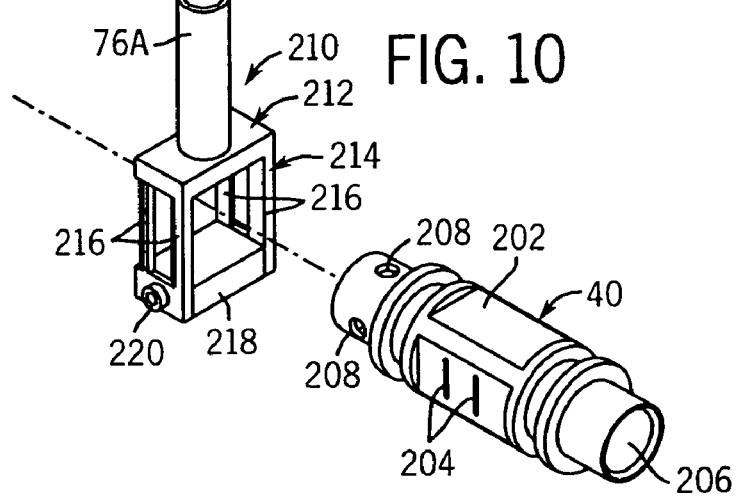

A larger nozzle body 40A is disposed in the nozzle chamber 32A (held in place by the plugs 42A) and sealed by two o-rings 200 located on each side of a middle section 202 thereof having a square outer cross-section through each of two opposite sides of which are a pair of spaced apart slots extending in the direction of extension of the main axis 38A defining four nozzle orifices 204 (see FIGS. 8–10). The nozzle orifices 204 open to a nozzle passageway 206 leading to four openings 208 in the wall of the nozzle body 40A opening to the nozzle chamber 32A. Thus, fuel can flow from the inlet passageway 16A in the manifold block 14A, through the inlet port 24A in the valve housing 12A into the nozzle chamber 32A and then through the nozzle passageway 206 via openings 208. When open, fuel can exit the nozzle passageway 206 via the nozzle orifices 204 and then pass from the valve housing 12A via outlet port 26A to the outlet passageway 18A in the manifold block 14A and onto the combustion can of the gas turbine engine.

Figure 11:
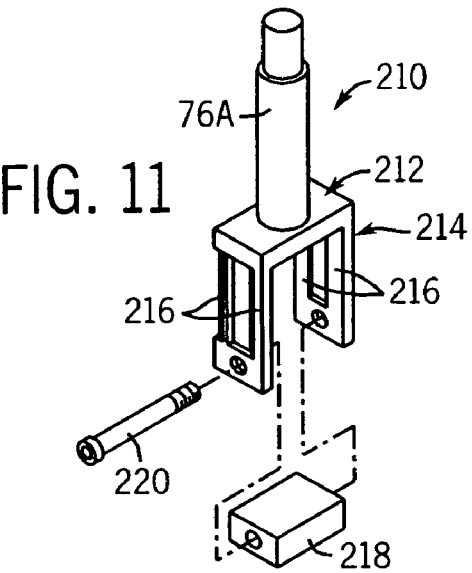
FIG. 11 is an exploded perspective view of the clevis assembly.

The nozzle orifices 204 are controlled by a bridged clevis assembly 210 (shown in FIG. 11). The bridged clevis assembly 210 includes a Y-shaped clevis 212 having a cylindrical stepped diameter stem 76A extending along the main axis 38A in the main chamber 36A and an opposite forked end 214 within the nozzle chamber 32A straddling the square section 202 of the nozzle body 40A. The forked end 214 has two spaced apart slotted prongs defining two pair of legs 216 joined at their terminal ends where a bridge block 218 is mounted by a bolt 220 threaded into the clevis 212. The legs 216 each have a tapered leading edge 222 to lower shear forces during operation and are spaced apart such that they each cover an equal portion of the nozzle orifices 204. The symmetric configuration of the clevis 212 makes it inherently balanced since the same pressure forces will act on each one of the prongs.

As before, the clevis stem 76A is brazed to a movable part 84A of a flexure pivot 82A, having a fixed part 80A bolted to the valve housing 12, together with an armature 88A of a magnetic drive assembly 90A. The flexure pivot 82A supports the clevis assembly 210 and the armature 88A exactly as described above with respect to the flapper valve member embodiment of the valve. Furthermore, the drive assembly 90A is identical to that previously described, including a wire coil 100A, a permanent magnet assembly 102A with two arched shaped permanent magnets and two pole pieces 106A. And, as before, the armature 88A is disposed in a magnetically inert guide sleeve 92A sealing off the main chamber 28A, via o-ring 96A and held in place by an end plate 98A spaced from the pole pieces 106A by non-magnetic spacers 110A.

Thus, the net effect on the armature 88A is a force tending to move the armature 88A toward one of opposite sides of the main axis 38A where either of the pole pieces 106A reside. Again, because the clevis assembly 210 and the armature 88A are supported by the flexure pivot 82A, driving the armature 88A side to side will cause the armature 88A/clevis assembly 210/movable part 84A to pivot about the center of the fixed part 80A of the flexure pivot 82A. Movement of the armature 88A to the right (in FIG. 7) moves the forked end 214 of the clevis 212 to the left to close off the nozzle orifices 304 simultaneously. The fully open and closed positions of the clevis assembly 210 are shown in FIGS. 8 and 9, respectively.

Thus, the above description describes two embodiments of a valve of the present invention suitable for use in an active combustion control system for controlling pressure fluctuations in the combustion chamber of a gas turbine. The valve is able to operate at very high rates required in such applications due to the pressure balancing, low mass and low drag of the valve member. The construction of the valve member also permits close mating clearances to be maintained constantly between the nozzle passageway and the valve member with large variations in pressure drops across the metering ports.

In operation as a part of an active combustion control system, the valve can be operated rapidly by a high speed controller or computer to vary the input current to the drive assembly (and thus vary the metering proportionally thereto) in response to pressure signals sent by a pressure transducer to counter and thus reduce the pressure fluctuations. For example, if a pressure increase is sensed by the pressure transducer the controller can rapidly change the input current to the valve to throttle the noble and reduce flow into the combustion chamber. The system does the opposite when low pressures are detected.

Pattern Factor Control

Figure 12:
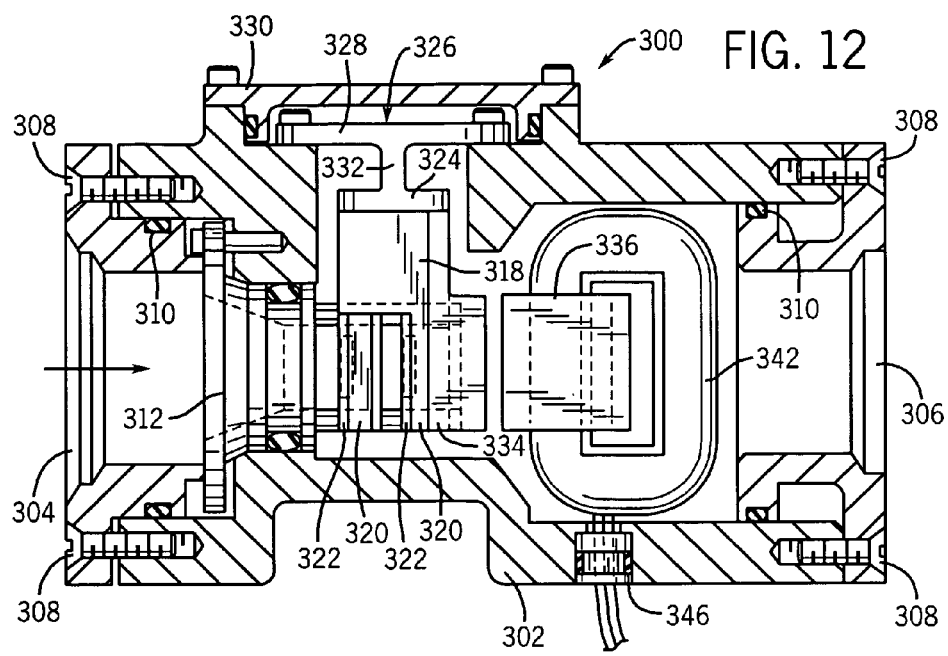
FIG. 12 is a sectional view of another embodiment of the valve of the present invention having particularly suited for use in regulating the pattern factor of a gas turbine, the valve being shown in the normally closed state.
Figure 13:
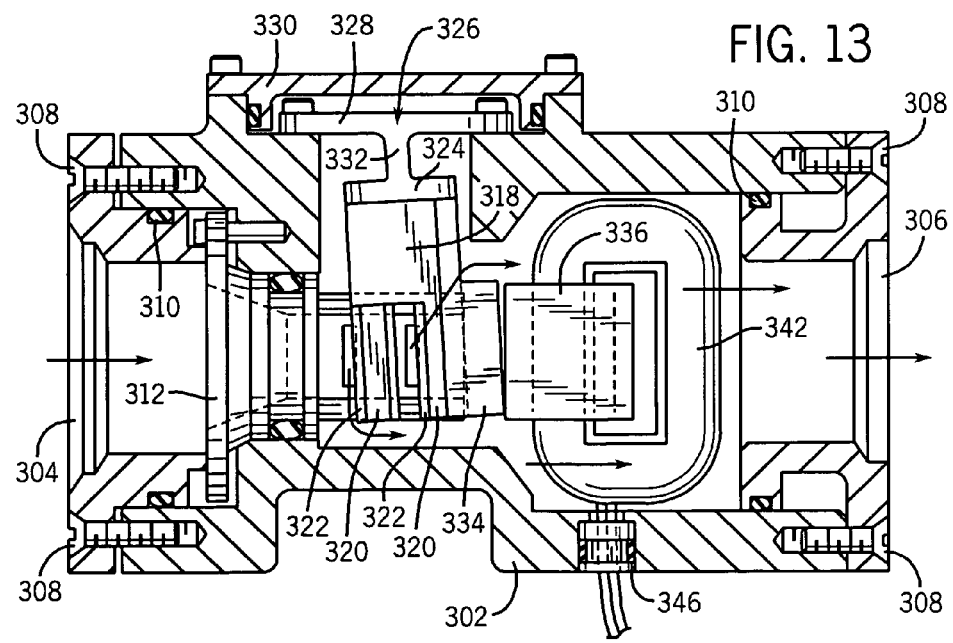
FIG. 13 is a view similar to FIG. 12 albeit shown in an open state.

As mentioned above, FIGS. 12–15 illustrate a pattern factor control valve ("PF valve") embodiment of the present invention designated by reference number 300. Referring to FIGS. 12 and 13, the PF valve 300 has an open-ended housing 302 within an inlet port fitting 304 and an outlet port fitting 306 at opposite ends. The port fittings 304 and 306 are secured in place with threaded fasteners 308 and sealed by O-rings 310. A valve body 312 is mounted with additional fasteners inside the housing 302 just inside of the inlet port fitting 304 and sealed with another O-ring. The port fittings 304 and 306 and the valve body 312 are aligned about the long axis of the housing 302 and define the fuel flow path through the PF valve 300.

The valve body 312 has a wide flanged end that is mounted to the housing 302, and it has a middle section 314 with two flat opposite sides through which are a pair of spaced apart slots extending perpendicularly to the long axis defining four orifices 316 (two shown). When open, the orifices 316 allow fuel from the inlet port 304 to flow through the passageway of the valve body 312 to the outlet port 306.

Figure 15:
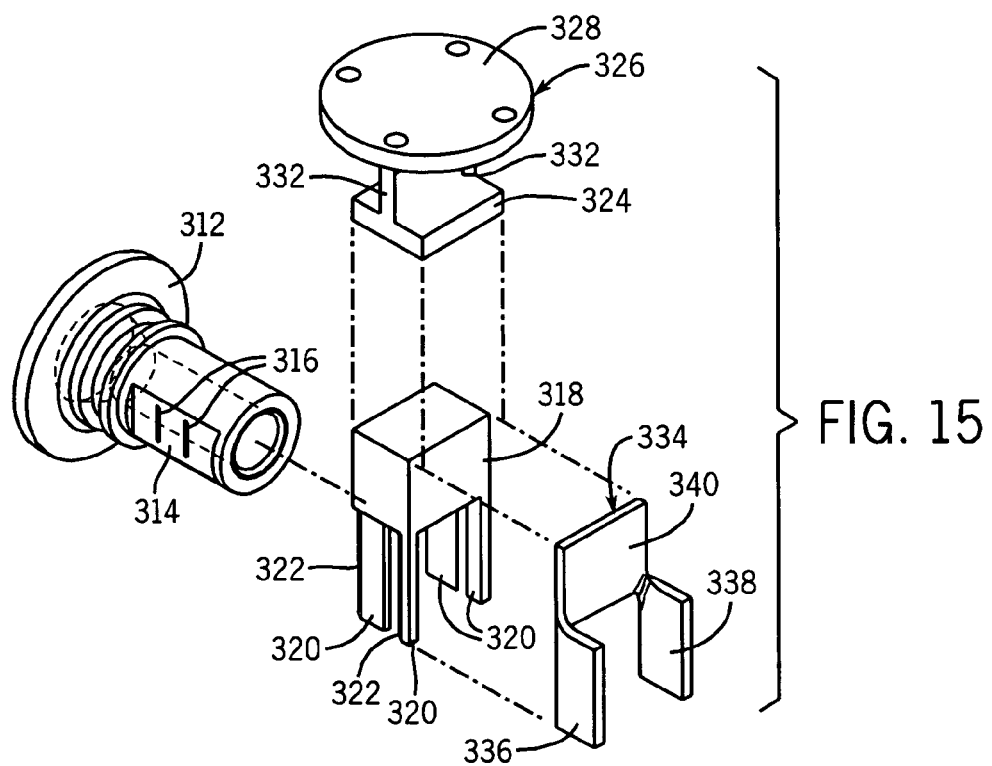
FIG. 15 is an exploded perspective view showing a clevis assembly of the valve of FIG. 12.

Flow through the orifices 316 is controlled by a clevis valve 318. As shown in FIG. 15, the clevis valve 318 has a block-like body with a forked or pronged end that defines two pairs of legs 320. The two pairs of legs are spaced apart so that the clevis valve 318 can straddle the square section of the valve body 312. The legs of each pair are also spaced apart so that each leg is associated with one of the orifices 316 such that each leg is located at the same position relative to the associated orifice 316. The legs 320 each have a tapered leading edge 322 to lower shear forces during operation. The symmetric configuration of the clevis valve 320 makes it inherently balanced since the same pressure forces will act on each one of the prongs.

Like the previously described embodiment, the clevis 318 is brazed to a movable part 324 of a flexure pivot 326, with its fixed part 328 being bolted to the valve housing 302 through a side opening therein that is enclosed by a sealed access panel 330 bolted to the valve housing 302. The movable part 324 of the flexure pivot 326 is connected to the fixed part 328 by two spokes 332, which are stiff but slightly deflectable to allow relative movement of the movable part 324.

The flexure pivot 326 also mounts an armature 334 to the valve housing 302. The armature 334 can be mounted directly to the clevis valve 318 or the movable part 324 of the flexure pivot 326, or both as shown in the drawings. The armature 334 is a metallic, generally U-shaped piece with opposite side walls 336 and 338 that extend in the direction of the long axis and are joined by a perpendicular back wall 340, which is brazed to the body of the clevis valve 318 and the movable part 324 of the flexure pivot 326. The side walls 336 and 338 are spaced apart (perpendicular to the long axis) far enough to allow a gap between each side wall and the valve body 312 so as not to obstruct flow through the orifices 316.

The armature 334 interacts magnetically with a U-shaped stator 336 that is clipped around a wire coil 342 making up the rest of the drive assembly. The edge surfaces of the armature 334 and the stator 336 are in close spaced relation. The coil 342 is contained within the valve housing 302 within the fuel flow path of the valve such that the fuel is used to cool the coil 342, thus obviating the need for any additional air or liquid cooling systems. Power leads are fed to the coil 342 through a sealed header 346 mounted in the side of the valve housing 302.

When current is applied to the coil 342 it acts as an electromagnet generating magnetic flux lines acting on the armature 334 that vary depending on the input current to the coil 342. The negative spring rate acting on the armature 342 from the magnetic flux lines is coupled with the positive spring rate of the flexure pivot 326 such that the combined force effect on the armature 334, and thus the clevis valve 318, is proportional to the input current to the coil 342. The net effect on the armature 334 is a force tending to move the clevis valve 318 in the direction of flow along the long axis of the PF valve 300. Since the clevis valve 318 and the armature 334 are supported by the flexure pivot 326, driving the armature 334 in this way will cause the armature 334/clevis valve 318/movable part 324 assembly to pivot about the center of the fixed part 328 of the flexure pivot 326. Movement of the armature 334 to the right in FIG. 1 moves the forked end of the clevis valve 318 to the right to open the orifices 316 simultaneously. The fully closed and opened positions of the PF valve 300 are shown in FIGS. 1 and 2, respectively.

The PF valve 300 is particularly suited for use in regulating the pattern factor of large, multi-burner gas turbine systems used in power generation. The pattern factor of a turbine relates to the temperature gradient profile across the flame front of the several burners of the turbine. The generally accepted expression for calculating pattern factor is the difference between peak and average temperatures at the combustor exit divided by the average exit temperature.

Figure 14:
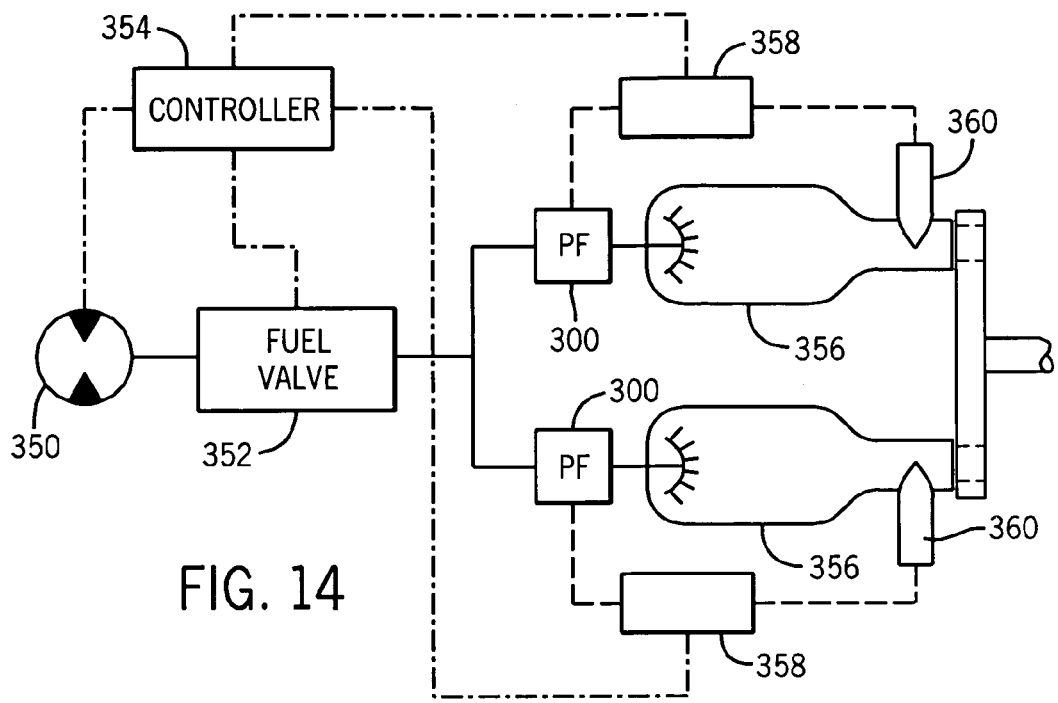
FIG. 14 is a schematic diagram of a multi-burner gas turbine system in which the valve of FIG. 12 is used.

A simplified schematic diagram of the relevant portion of such a turbine is shown in FIG. 14. The system includes a fuel pressurizer 350 and main fuel control valve 352, which is controlled by a dedicated or master electronic control unit 354 that controls overall flow of pressurized fuel to the combustion side of the turbine. In line between the main control valve 352 and each of the individual burners 356 of the turbine is a PF valve 300. The electromagnetic drives of the PF valves 300 are controlled by dedicated electronic control units 358 which receive temperature feedback signals from thermocouples 360 at the outlet side of the burner combustion chambers (or combustion cans). The temperature feedback signals are processed by electronic control unit 354. Low temperature readings at one or more of the burners is corrected by signaling the associated PF valve 300 to increase fuel flow to its burner, with the goal of achieving a uniform temperature profile, and thus low pattern factor, at the overall flame front of the turbine such that the average temperature is as close as possible to the peak temperature. Each PF valve 300 of the system can be controlled precisely to either increase or decrease fuel flow to its associated burner to provide an essentially uniform temperature profile. As mentioned, the position of the PF valves 300 is proportional to the input signal to the electromagnetic drive, thus allowing accurate electronic control of the PF valve 300 at each burner. The PF valve 300 is capable of sustained operation at high flow rates, for example, 1,500 lb/hr.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

I claim:

1. A fuel valve for a turbine, the valve comprising:
a valve housing having an inlet port and an outlet port;
a valve body disposed within the valve housing and defining a passageway and a pair of orifices in communication with the inlet and outlet ports;
a clevis valve member having at least two spaced apart prongs located adjacent to the valve body to interrupt flow through the orifices when the clevis valve member is in a closed position so as to prevent flow from the inlet port to the outlet port;
a flexure pivot having a first end mounted to the housing and having a second end movable relative to the first end and coupled to the clevis valve member to permit the clevis valve member to pivot between the closed position and an open position in which the prongs open the orifices to permit flow from the inlet port to the outlet port; and
a drive assembly for effecting movement of the clevis valve member between the open and closed positions.

2. The valve of claim 1, the orifices are located at opposite sides of the valve body and the clevis valve member straddles the valve body so that at least one prong is located at each of the opposite sides of the valve body.

3. The valve of claim 2, wherein the clevis valve member has two sets of two prongs and the valve body has two sets of two orifices located at the opposite sides of the valve body.

4. The valve of claim 1, wherein the drive assembly includes an electromagnetic coil and includes an armature coupled to one of the clevis valve member and the second end of the flexure pivot.

5. The valve of claim 4, wherein the drive assembly is disposed in the valve housing in the flow path between the inlet and outlet ports.

6. The valve of claim 4, wherein the drive assembly further includes a stator spaced from the armature.

7. The valve of claim 4, wherein the armature has a U-shape construction with a pair of side walls disposed at and spaced from opposite sides of the valve body and a back wall bridging the side walls.

8. The valve of claim 7, wherein the side walls have end surfaces that are spaced from corresponding end surfaces of a stator fixed with respect to the electromagnetic coil.

9. The valve of claim 1, wherein the clevis valve member moves in proportion to an input current to the drive assembly.

10. The valve of claim 1, wherein the flexure pivot has a movable part and a fixed part in a plane spaced from the movable part and joined thereto by a flexible spoke.

11. The valve of claim 1, wherein the clevis valve member is pressure balanced.

12. The valve of claim 1, wherein the orifices are slots.

13. The valve of claim 1, wherein each of the prongs has an elongated tapered leading edge.

14. The valve of claim 1, wherein the valve body defines two pairs of spaced apart orifices and each prong of the clevis valve member defines two legs spaced apart in registration with the orifices such that pivoting of the clevis valve member moves each leg of the clevis member the same distance with respect to its associated orifice.

15. A fuel valve for a turbine, the valve comprising:
a valve housing defining a fuel flow path between an inlet port and an outlet port;
a valve body disposed within the valve housing in the fuel flow path and defining a passageway and a pair of orifices in communication with the fluid flow path;
a clevis valve member having at least two spaced apart prongs located adjacent to the valve body to interrupt flow through the orifices when the clevis valve member is in a closed position so as to prevent flow from the inlet port to the outlet port;
a flexure pivot having a first end mounted to the housing and having a second end movable relative to the first end and coupled to the clevis valve member to permit the clevis valve member to pivot between the closed position and an open position in which the prongs open the orifices to permit flow from the inlet port to the outlet port; and
a magnetic drive assembly having an electromagnet and an armature coupled to one of the flexure pivot second end and the clevis valve member to effect pivoting of the clevis valve member between the open and closed positions, wherein the drive assembly is disposed within the valve housing in the fuel flow path.

16. The valve of claim 1, wherein the clevis valve member moves in proportion to an input current to the drive assembly.

17. A fuel valve for a turbine, the valve comprising:
a valve housing having an inlet port and an outlet port;
a valve body disposed within the valve housing defining a passageway and having two opposite sides with orifices in communication with the inlet and outlet ports; and
a clevis valve member having at least two spaced apart prongs that straddle the valve body so that at least one prong is located at each of the two opposite sides of the valve body so that the clevis valve member is pressure balanced about the valve body, the clevis valve member being pivotally mounted within the valve housing so as to pivot relative to the valve body between an open position in which the prongs are at least partially clear of the orifices and a closed position in which the prongs essentially close off flow through the orifices so as to prevent flow from the inlet port to the outlet port.

18. The valve of claim 17, further including a flexure pivot coupled to the valve housing and the clevis valve member to permit the clevis valve member to pivot between the closed and closed positions.

19. The valve of claim 17, further including a drive assembly for effecting movement of the clevis valve member between the open and closed positions, and wherein the clevis valve member moves in proportion to an input current to the drive assembly.

20. The valve of claim 17, wherein the two opposite sides of the valve body each define two pairs of spaced apart orifices and each prong of the clevis valve member defines two legs spaced apart in registration with the orifices such that pivoting of the clevis valve member moves each leg of the clevis member the same distance with respect to its associated orifice.

* * * * *

UNITED STATES PATENT AND TRADEMARK OFFICE
CERTIFICATE OF CORRECTION

PATENT NO. : 7,137,613 B2  
APPLICATION NO. : 11/268013  
DATED : November 21, 2006  
INVENTOR(S) : Harvey B. Jansen It is certified that error appears in the above-identified patent and that said Letters Patent is hereby corrected as shown below:

Col. 8, Line 15, change "noble" to --nozzle--.

Signed and Sealed this

Sixth Day of March, 2007

JON W. DUDAS  
*Director of the United States Patent and Trademark Office*